Sept. 28, 1965  G. R. ASCHAUER  3,208,570
VANE-TYPE FLUID CLUTCH
Filed Oct. 7, 1963  3 Sheets-Sheet 1

INVENTOR.
GEORGE R. ASCHAUER
BY
Lieber & Nilles
ATTORNEYS

Sept. 28, 1965 G. R. ASCHAUER 3,208,570
VANE-TYPE FLUID CLUTCH

Filed Oct. 7, 1963 3 Sheets-Sheet 2

INVENTOR.
GEORGE R. ASCHAUER
BY Lieber & Nilles
ATTORNEYS

Sept. 28, 1965  G. R. ASCHAUER  3,208,570
VANE-TYPE FLUID CLUTCH
Filed Oct. 7, 1963  3 Sheets-Sheet 3

INVENTOR.
GEORGE R. ASCHAUER
BY Lieber & Nilles
ATTORNEYS

United States Patent Office 3,208,570
Patented Sept. 28, 1965

3,208,570
VANE-TYPE FLUID CLUTCH
George R. Aschauer, Racine, Wis., assignor to Twin Disc Clutch Company, Racine, Wis., a corporation of Wisconsin
Filed Oct. 7, 1963, Ser. No. 314,165
2 Claims. (Cl. 192—58)

The present invention relates generally to fluid clutches of the type having hydraulically retractable vanes which coact with a cam ring to transmit power in either direction.

Clutches of this character have been used in power transmission systems wherein they provide (1) a full drive in which the vanes are fully extended in order to rotate the input and output members at substantially the same speed; (2) controlled slippage between the vanes and the cam ring, thereby providing a lesser speed, or a "creeping" drive; and (3) a "free" or "slip" drive in which the vanes are radially retracted and held out of engagement with the cam ring.

Heretofore, fluid clutches of this type have not proven to be completely satisfactory for several reasons: For one thing, they have been very complicated, requiring numerous and complicated parts and valves to either lock the vanes in the retracted position or provide for circulation of the fluid from one side of the vane, through the rotor and then to the other side of the vane, when controlling the driving pressure of the vanes against the cam ring. The latter arrangement is shown in the U.S. Patent No. 3,042,163, issued July 3, 1962, to R. L. Lapsley.

Another problem of some prior art devices was in overheating of the vane tips and consequent "burning" and premature wear thereof. Overheating of the fluid medium itself has been a serious problem heretofore, notwithstanding various attempts to recirculate and cool it.

An object of the present invention is to provide an improved fluid clutch of the retractable vane type, which clutch can function either as a fluid drive or as a friction clutch, or as a combination of both. In this respect, the pressure which the vane tips exert on their associated cam ring can be closely regulated and varied to suit the desired operating condition.

Another aspect of the present invention relates to an improved fluid clutch of the type in which the vanes can be retracted or extended by means of pressure fluid acting thereon, and in which clutch the vanes are located on the output, that is, the driven member. With this construction and operation, the vanes rotate with the output member and are not subject to the centrifugal force of the input member, and this centrifugal force need not be overcome during the clutch release operation; the blades are subject to centrifugal force as the speed of the clutch rises—centrifugal force adds to the operative torque capacity but falls off with load speed.

Furthermore, the invention provides a closed fluid system having a positive exhaust from and charging of the fluid to the clutch, external recirculation and cooling of the fluid, and a fluid pressure regulator for controlling the pressure of the fluid in the clutch and consequently the amount of clutching action obtained. The regulator is located in this closed system immediately ahead of the fluid cooler whereby the heat produced by the regulator is immediately removed by the cooler.

Still another aspect of the present invention relates to an improved and economically fabricated vane assembly and its cooperating chamber in the rotor which define vane extending and retracting sections. This fluid chamber can be formed by a simple milling operation which greatly facilitates the manufacture of the parts at a reduced cost and eliminates the need of numerous parts found in prior art devices.

Another aspect of the present invention relates to an improved method for operating a vane-type clutch of the fluid actuated vane type.

These and other objects and advantages of the present invention will appear hereinafter as this disclosure progresses, reference being had to the accompanying drawings, in which.

It should be understood that the present invention can be utilized with various fluid mediums such as oil, water, air, or others, and whether they are incompressible or compressible to a certain extent.

Figure 1:
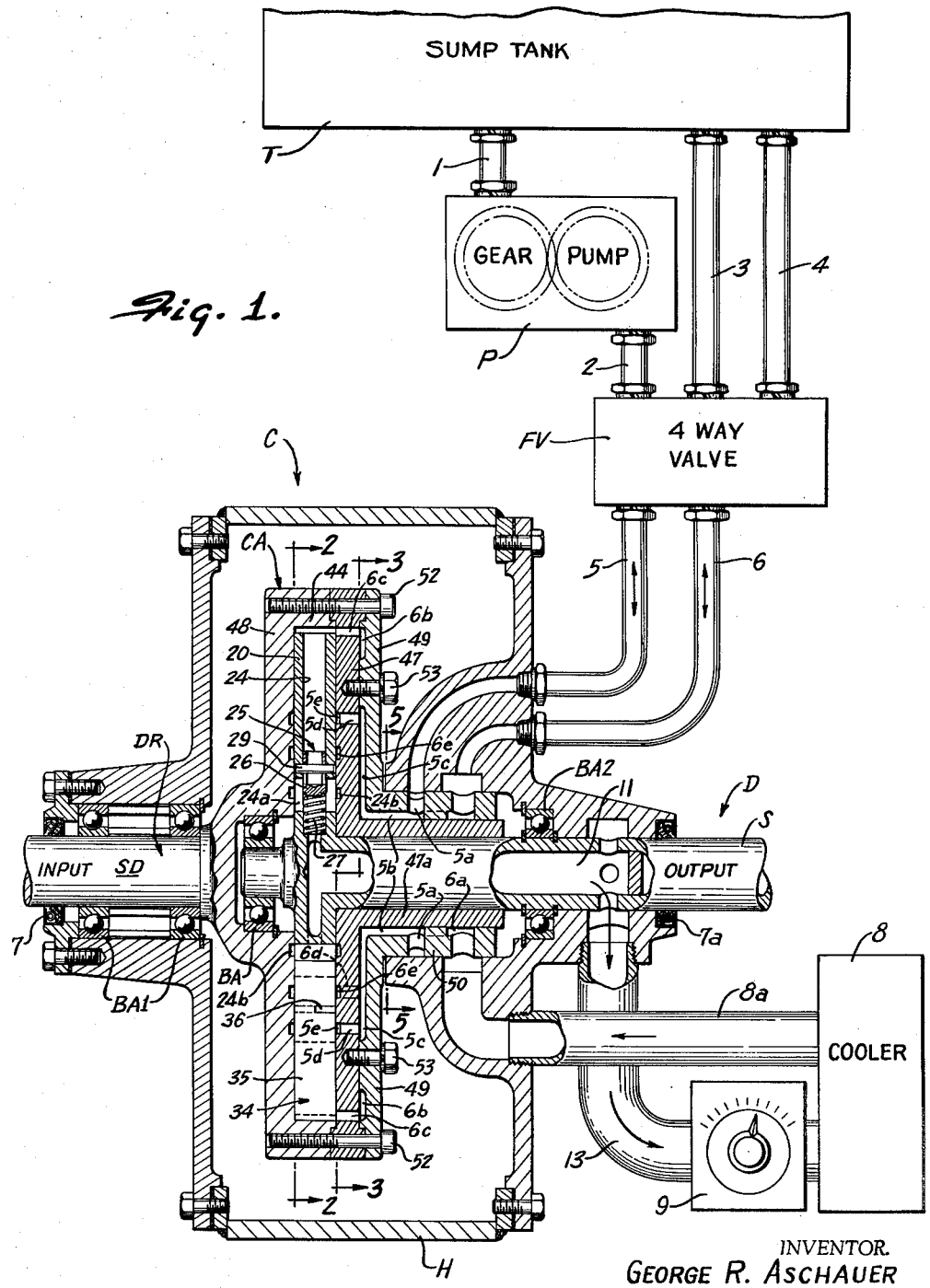
FIGURE 1 is a longitudinal, cross-sectional view taken along line 1—1 in FIGURE 2 through a clutch embodying the present invention.

Referring in greater detail to the drawings, and particularly to FIGURE 1, a fluid pump P is connected by a conduit 1 to a reservoir or tank T from which it draws fluid and delivers it via conduit 2 to a four-way valve FV. This valve is connected by relief conduit 3 and return conduit 4 to the tank, and by release conduit 5 and intake conduit 6 to a clutch C.

The clutch has a driven or output member D which includes a shaft S, and a drive or input member DR which includes a drive shaft SD. Shaft S is piloted in an antifriction bearing assembly BA secured in an enlarged end of shaft SD. A stationary clutch housing H supports the shafts SD and S by antifriction bearing assemblies BA1 and BA2, respectively. Suitable shaft seals 7 and 7a are provided between the housing H and the respective shafts.

A cooler 8 for the fluid is in communication via conduit 8a with the annular passage 6a of the clutch, and a fluid pressure regulator valve 9 places the discharge passage 11 in shaft S in communication with the cooler via conduit 13. With this externally located fluid pump arrangement, the fluid is positively taken from and delivered to the clutch in a closed circuit which includes the cooler. This pump acts to provide leakage make-up, insure initial radial outward movement of the vanes to be described, and also insure complete and prompt release of the vanes from a cam ring, to be described, so as to provide positive release of the clutch when there is no hydrostatic discharge, all of which will more fully appear as this disclosure progresses.

*The rotor*

Figure 2:
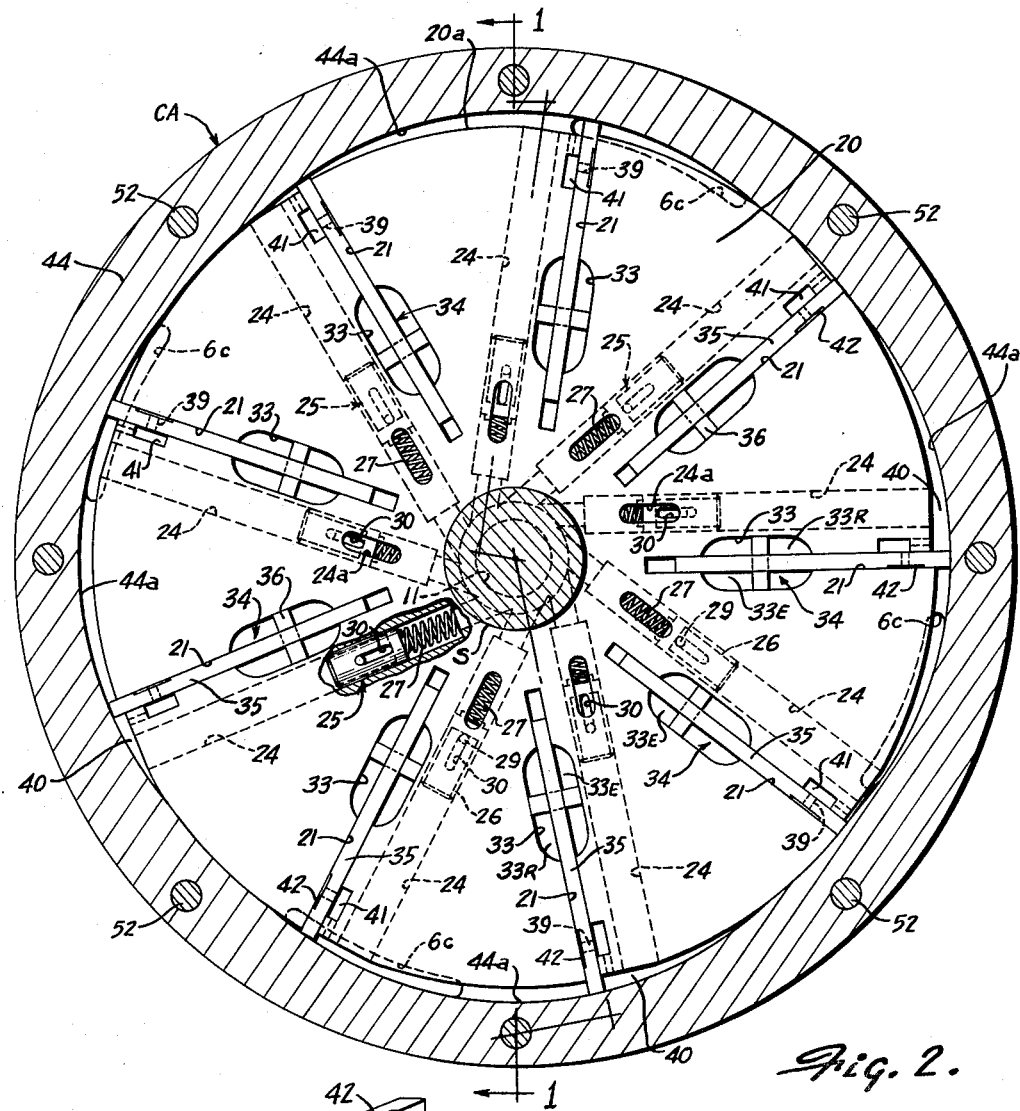
FIGURE 2 is a transverse, sectional view on an enlarged scale, taken along line 2—2 in FIGURE 1.
Figure 4:
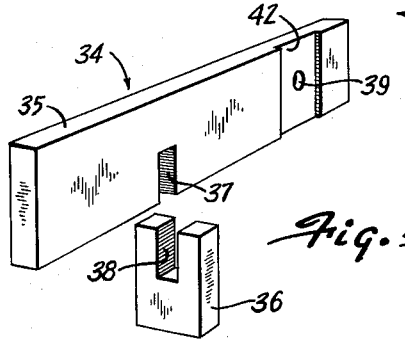
FIGURE 4 is a perspective, exploded view of the blade assembly shown in FIGURES 1 and 2.

A cylindrical vane rotor 20 is fixed to the end of shaft S and has a plurality of circumferentially spaced and radially extended vane slots 21 therein which extend across the full width of the rotor. Adjacent each slot, and generally parallel therewith, as viewed in FIGURE 2, is a fluid discharge passage 24 which extends from the periphery 20a of the rotor and radially inwardly where it communicates, via elongated openings 24a in the rotor, with the annular passage 24b and the axial discharge passage 11 in shaft S.

Within each discharge passage 24 is located a one-way check valve 25 in the form of a spring biased piston 26 which is urged radially outward by its spring 27. Pins 29 are fixed in the rotor and extend through aligned openings 30 in the pistons.

These one-way valves 25 act to permit fluid, which has been discharged by the vanes as will appear, to flow during the pumping cycle radially inwardly through openings 24a and annular chambers 24b when the pistons are urged radially inwardly against their spring pressure, and to the discharge passage 11 in shaft S. These valves prevent flow in the opposite direction during the suction or intake strokes.

A vane actuating chamber 33 is formed in the rotor adjacent and across each of the vane slots. This chamber can be economically formed by a simple milling operation by the use of the vane assembly to be described, and the chamber need not be formed from additional, complicated, and costly parts.

*Vane assembly*

A vane assembly 34 is provided for each vane slot and chamber arrangement, and this assembly includes the vane proper 35 and a cross head 36 which are rigidly connected together at right angles by their respective interengaging slotted openings 37 and 38. The head 36 divides the chamber 33 into a vane retracting section 33R and a vane extending section 33E. The vane assembly can be put together while the vane member 35 is in the slot and the rotor is out of the housing.

Adjacent its outer end, the vane also has a port 39 extending therethrough for permitting high pressure fluid from the pressure side or pumping chamber 40 to be conducted via port 41 in the rotor to the recess 42 in the rear side of the vane, and thereby provide a high pressure hydrostatic bearing at the rear side of the vane.

*Cam ring assembly*

A cam ring assembly CA includes a cam ring 44 and a radially inwardly extending portion 48 and 49 at opposite sides of the ring, one of which may be formed integrally with the ring. The other portion 49 has a hub portion 50 which is supported on and surrounds a hub portion 47a of the valve plate 47. Cap bolts 52 secure the portion 49 and valve plate 47 to the cam ring, and smaller cap bolts 53 secure the valve plate 47 to inwardly extending portion 49.

The cam ring 44 has four chambers or lobes 44a formed around its interior surface and into which fluid flows from the intake ports 6c in the valve plate 47 at one end of the rotor. This fluid then acts, under the influence of the driven cam ring, to drive the vanes and their associated member D.

Figure 3:
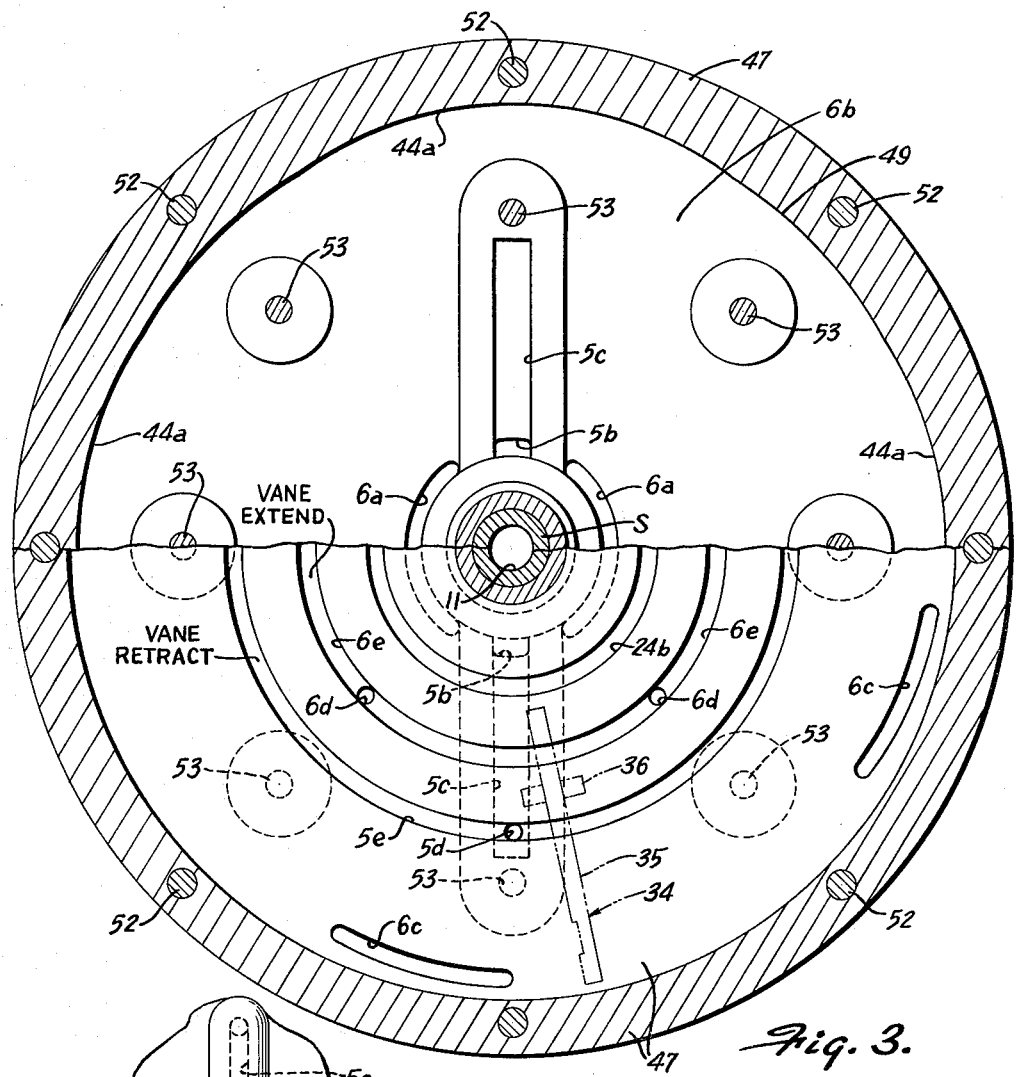
FIGURE 3 is a transverse, sectional view taken along line 3—3 in FIGURE 1, but on an enlarged scale.
Figure 5:
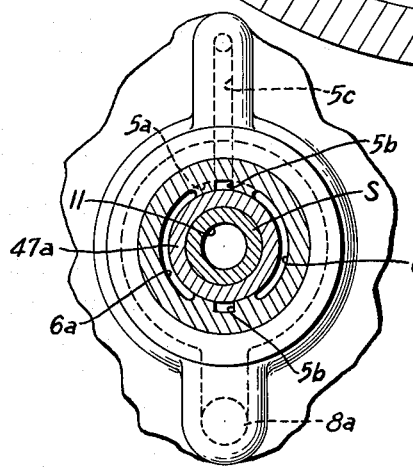
FIGURE 5 is a sectional view taken along line 5—5 in FIGURE 1.

Referring again to the conduits from the pump, conduit 6 communicates with the two annular fluid passages 6a which are in communication with the large annular area 6b (FIGURE 3) formed in the side wall 49 of the cam assembly.

*Operation*

Area 6b forms a low pressure area for the intake oil which then passes into the intake ports 6c from which it is then moved by the vanes through the radially extending discharge passages 24 in the rotor. This discharged fluid then opens and passes through the one-way check valves 25 in the rotor and enters the axial passage 11 from which it passes through conduit 13, regulating valve 9, and into the fluid cooler 8. After being cooled, this fluid is then returned via conduit 8a into passage 6a for again activating the blades to drive the output member. In this manner, a portion of the fluid is continually passed through the cooler in the closed, external circuit where the pressure thereof can also be regulated.

Fluid also passes from the large low pressure area 6b through ports 6d, into the annular passage 6e formed in the valve plate 47, and then into chamber 33E to extend the vanes.

Conduit 5 communicates with retracting chambers 33R in the rotor via the annular fluid passage 5a, the two circumferentially spaced, axial passages 5b, the radially extending passages 5c in side wall portion 49, bores 5d in valve plate 47, and an annular passage 5e also in the valve plate. When it is desired to retract the vanes to disengage the clutch, the valve FV is actuated to then permit fluid to enter chambers 33R, and this fluid pressure on the cross head serves to retract the vanes. At the same time, fluid in chamber 33E is exhausted via annular passage 6e and cross ports 6d in the valve plate, through large annular space 6b between the cam assembly wall 49 and the valve plate 47, passages 6a, conduit 6, and back through valve FV to the tank.

Thus, as the fluid is delivered to the working chambers between the cam ring assembly and the rotor, to permit the cam ring to drive the vanes and the associated output member, the vanes are held against the cam ring with any degree of pressure due to the amount of pressure in section 33E, section 33R being exhausted to atmosphere through the tank.

The present clutch can thus be regulated so that the rotation of the input member causes the cam ring, through fluid in the working chambers, to drive the vanes and their associated output member. In this condition, the vane tips may be urged with a light pressure against the cam ring so that the load is being transmitted through the fluid, and the clutch then operates as a hydrostatic clutch.

It may be desirable to cause the present clutch to function as a friction clutch only, and in that situation the pressure in chambers 33E would be increased to cause the blades to bear tightly against the cam ring, and the frictional engagement would be such as to transmit the load. In this situation, a clutch of low slip characteristics is provided.

In order to function as a friction clutch, it may be desirable to provide a material of a high coefficient of friction on the tips of the blades so as to facilitate frictional engagement.

Because the controllable vanes are located on the output member, they can be relieved of the centrifugal force due to rotation of the input member, that is to say, in commencing clutch engagement, the blades are subjected to centrifugal force in a smoothly progressive manner as the output speed rises. When declutching is to occur, the blades are retracted and then no longer subjected to centrifugal force of the input member which results in an efficient declutching operation.

By means of the fluid pressure regulator 9, the pressure of the fluid in the working chambers of the clutch can be increased to increase the clutching action, that is, increase the speed of the output member until it assumes the speed of the input or driving member. This regulator is located in the external circuit with the cooler, which circuit is positively charged and continually cools a portion of the fluid.

Various modes of carrying out the invention are contemplated as being within the scope of the following claims particularly pointing out and distinctly claiming the subject matter which is regarded as the invention.

1. A fluid clutch of the type having a rotor with a plurality of spaced apart vane slots each containing a vane mounted for sliding movement within its respective slot, a cam ring assembly including a cam ring surrounding said rotor and inwardly extending portions at the ends of the rotor, said vanes having sides which are in sealing relation with the said inwardly extending portions of said cam ring assembly, enlarged chambers in said rotor and one in communication with each of said slots, said vanes each having a head portion mounted for movement within and exposed to its associated chamber and dividing said chamber into an inner section and an outer section, means for selectively supplying fluid under pressure to the outer section of said chamber to develop a force on said head portion acting to move said vane in a vane retracting direction or for supplying fluid under pressure to said inner section to develop a force on said head portion acting to move said vane in a blade extending direction into sealing relation with said cam ring, discharge passages in said rotor for conducting fluid moved by the cam ring and extended vanes out of said clutch, and inlet passage means for conducting fluid into said clutch for movement by said vanes, the improvement comprising an external closed circuit including a cooler and a regulator valve for said fluid and in fluid communication with said discharge passages in said rotor and with said inlet passage means, whereby a portion of fluid is continually passed through said external circuit for cooling and regulating thereof.

2. A fluid clutch comprising, a driven member including a cylindrical vane rotor having a plurality of spaced apart vane slots, a drive member including coaxial cam ring assembly including a cam ring surrounding said rotor and inwardly extending portions at the ends of the rotor, a plurality of vanes respectively mounted for sliding movement within said slots between a retracted position within said rotor to an extended position engaging said cam ring, the ends of said vanes being in sealing relation with the said inwardly extending portions, enlarged chambers in said rotor and one in communication with each of said slots, a head portion on each of said vanes and mounted for movement within and exposed to its associated chamber and dividing said chamber into an inner section and an outer section, an external fluid pump and control means for selectively supplying fluid pressure to the outer section of said chamber to develop a force on said head portion acting to move said vane in a vane retracting direction or for supplying fluid to said inner section at a pressure sufficient to develop a force on said head portion acting to move said vane in a blade extending direction into frictional driving engagement with said cam ring, discharge passages in said rotor for conducting fluid moved by the cam ring and extended vanes out of said clutch, inlet passage means for conducting fluid into said clutch for movement by said vanes, and an external closed circuit including a fluid cooler and a fluid pressure regulator in fluid communication with said discharge passages in said rotor and with said inlet passage means.

References Cited by the Examiner
UNITED STATES PATENTS

| | | | |
|---|---|---|---|
| 1,917,972 | 7/33 | Henriot | 192—58 |
| 2,576,156 | 11/51 | Trofimov. | |
| 2,714,858 | 8/55 | Barkeij | 103—136 |

DON A. WAITE, *Primary Examiner.*